United States Patent [19]

Collette et al.

[11] Patent Number: 5,172,224

[45] Date of Patent: Dec. 15, 1992

[54] PRINTER CALIBRATION METHOD USING ELECTRONICALLY-DECOUPLED COLOR AND TONE SCALE ADJUSTMENTS

[75] Inventors: Robert P. Collette, Pavilion; William K. Hickok, Rochester, both of N.Y.

[73] Assignee: Eastman Kodak Company, Rochester, N.Y.

[21] Appl. No.: 629,515

[22] Filed: Dec. 18, 1990

[51] Int. Cl.$^5$ .................. G01D 18/00; H04N 1/46
[52] U.S. Cl. ............................. 358/80; 358/406;
358/296; 355/208; 355/327; 346/157
[58] Field of Search ............... 358/406, 80, 296;
346/157; 355/327, 326, 208

[56] References Cited

U.S. PATENT DOCUMENTS

| | | | |
|---|---|---|---|
| 4,334,240 | 6/1982 | Franklin | 358/80 |
| 4,631,579 | 12/1986 | Hoffrichter et al. | 358/80 |
| 4,670,780 | 6/1987 | McManus et al. | 358/80 |
| 4,745,467 | 5/1988 | Sekizawa et al. | 35/80 |
| 4,751,535 | 6/1988 | Myers | 346/157 |
| 4,812,903 | 3/1989 | Wagensonner et al. | 358/80 |
| 4,819,193 | 4/1989 | Imaa | 364/526 |
| 4,831,434 | 5/1989 | Fuchsberger | 358/80 |
| 4,841,360 | 6/1989 | Birgmeir | 358/80 |
| 4,862,255 | 8/1989 | Takanaski et al. | 358/80 |
| 4,864,391 | 9/1989 | Taguchi | 358/80 |
| 4,928,167 | 5/1990 | Tatsumi et al. | 358/80 |
| 4,949,135 | 8/1990 | Ng | 355/327 |
| 5,018,085 | 5/1991 | Smith, Jr. | 358/80 |
| 5,053,866 | 10/1991 | Johnson | 358/75 |
| 5,075,725 | 12/1991 | Rushing | 355/208 |

Primary Examiner—Edward L. Coles, Sr.
Assistant Examiner—Jill Jackson
Attorney, Agent, or Firm—David M. Woods

[57] ABSTRACT

A calibration utility 22 for electronically-generated images decouples tone scale and color corrections by completing tone scale and color balance corrections upon separate RGB image signals (representative of intensity) and hue and saturation corrections upon combinations of RGB signals (representative of chrominance). An operator adjusts tone scale controls 32 and color controls 34, which provide values for calibrating separate RGB tone scale look-up tables 49a, 49b, and 49c and a color matrix 48 in a printer 14. To decouple the corrections, the tone scale look-up tables 49a, 49b, 49c are adjusted until the brightness of a predetermined number of image levels is accurately rendered. If the resultant image signal contains coloration in neutral areas, the values in the particular look-up table(s) for the color(s) producing the color cast in the neutral areas is adjusted, thereby producing a neutrally-adjusted image signal substantially free of neutral coloration. The hue and saturation of the image can then be adjusted by modifying terms in the color matrix 48 without affecting the tone scale reproduction.

6 Claims, 5 Drawing Sheets

PRINTER CALIBRATION METHOD USING ELECTRONICALLY-DECOUPLED COLOR AND TONE SCALE ADJUSTMENTS

BACKGROUND OF THE INVENTION

1. Field of the Invention

This invention pertains to the calibration of an electronic output system for use with a color printer so that the final print obtained looks like an image obtained on a video monitor, both in color and tone scale parameters. More particularly, the invention pertains to a method for decoupling color and tone scale so that an adjustment of one parameter does not affect the other parameter.

2. Background Art

It is a common objective of a printing system to obtain a satisfactory match between an output print and an image produced of the print on a monitor. Electronic image processing is frequently used to adjust the color saturation and the contrast (tone scale) of the monitor image to the characteristics of the copy material or to accentuate the color saturation and contrast of the original image. Experience has shown that, for production of optimal images, several image parameters must be adjusted, or be capable of adjustment, including: the contrast (tone scale or brightness gradation), the neutral color balance, the color saturation, and the color tone or hue. Ordinarily, the adjustment of one parameter interacts with another parameter, i.e., the adjustment of one parameter is interdependent upon another parameter. When the gradation changes, for example, the color saturation changes as well.

One way of dealing with this interdependence is disclosed in U.S. Pat. Nos. 4,812,903 and 4,831,434. Initially, in accordance with known video techniques, RGB image signals are transformed into a brightness signal Y (luminance signal) and two color difference signals U, V (chrominance signals). Contrast (brightness gradation) is then corrected in the luminance channel and color saturation is separately corrected in the chrominance channel. Since changing the luminance continues to have an effect on color saturation, however, the '903 and '434 patents teach automatic correction of the color saturation in dependence upon the post-contrast processed luminance signal. More specifically, the correction is achieved by measuring the luminance signals $Y_1$ and $Y_2$ which occur, respectively, before ($Y_1$) and after ($Y_2$) contrast processing, and multiplying their quotient ($Y_2/Y_1$) by each of the two chrominance signals U,V.

According to such a known technique, the color impression (color tone and color saturation) remains unchanged, even in the case of deliberate contrast changes in the luminance channel. This happens, of course, because there is automatic compensation for the increase in color saturation which accompanies a brightness reduction and for the decrease in color saturation which accompanies a brightness increase. Thus, despite the ability to change brightness gradation separately from color saturation, the independence achieved is incomplete since both channels must be modified for a deliberate change in one channel.

SUMMARY OF THE INVENTION

The principal objective of the invention is to more completely decouple tone scale and color corrections, so that one parameter can be changed without necessitating a change in the other parameter.

Although the transformation of an image signal into luminance and chrominance signals is widely used in the video art to carry out electronic color correction, better decoupling can be obtained in the color printing art by completing the brightness gradation and color balance corrections upon separate RGB color component signals representing brightness, or intensity values, and then completing hue and color saturation correction upon combinations of RGB signals representative of chrominance values.

According to the invention, an electronic output system of a color printer includes a tone scale look-up function for correcting tone scale errors and a color matrix for correcting color errors. The method includes the steps of providing separate tone scale look-up tables for respectively processing each of the color component signals; adjusting the tone scale look-up tables until the brightness of a predetermined number of image levels is accurately rendered; providing a neutral correction to the color component signals, thereby obtaining a neutrally-adjusted image signal substantially free of neutral coloration; generating and examining the neutrally-adjusted image for further color errors; and then generating new color matrix terms based on changes in either hue or saturation, or both, for minimizing the color errors.

In one embodiment, the step of providing a neutral correction includes generating and examining the tone-corrected image for coloration in neutral areas, and adjusting all the values in the particular look-up table(s) for the one or more colors producing the coloration, thereby producing a neutrally-adjusted image signal. In another embodiment, the neutral correction is provided by special printer calibration tables for separately processing the color component signals. The preferred embodiment includes both forms of neutral correction.

BRIEF DESCRIPTION OF THE DRAWINGS

The invention will be described in relation to the drawings, in which.

DESCRIPTION OF A PREFERRED EMBODIMENT

Figure 1:
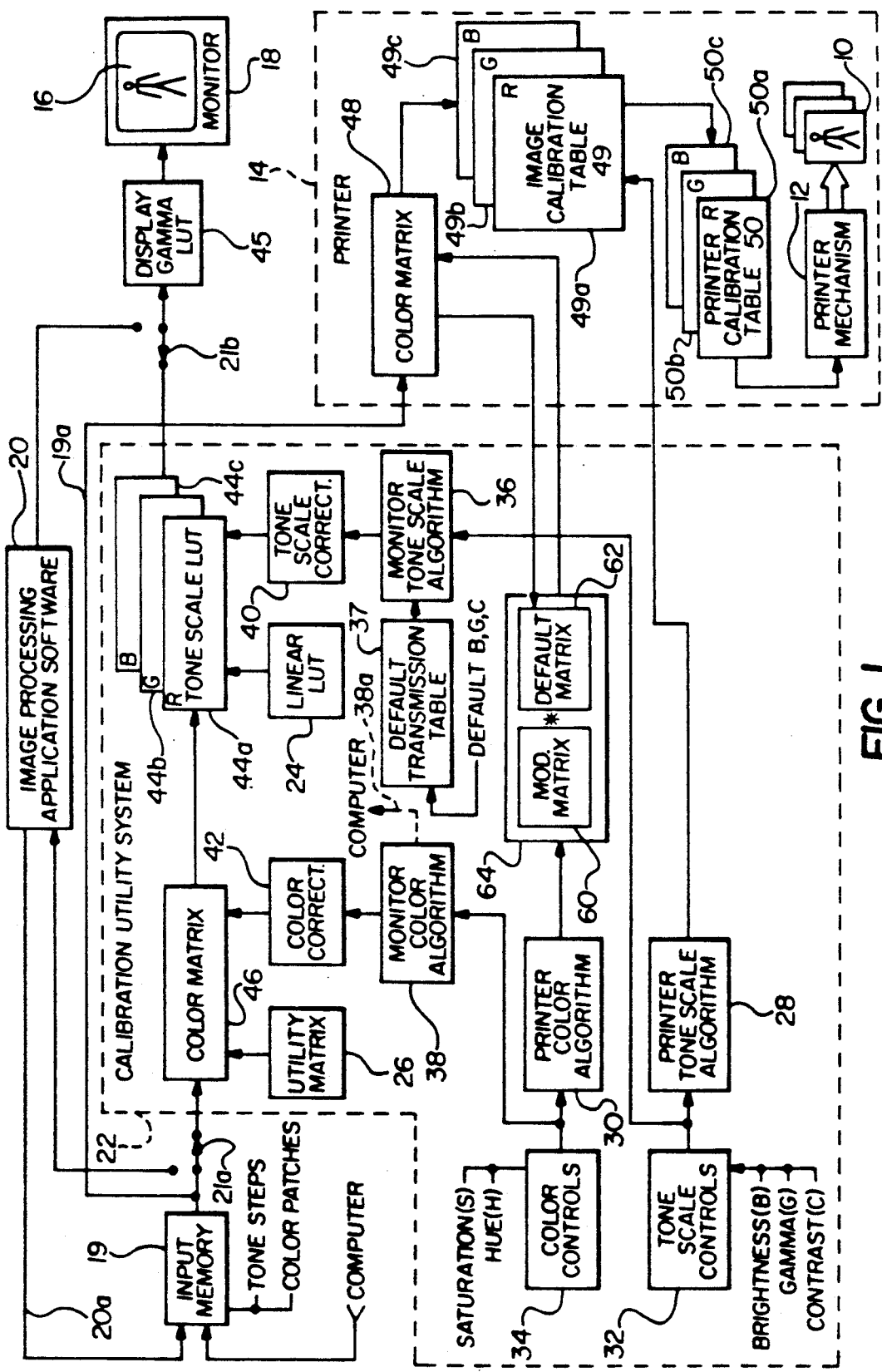
FIG. 1 is a block diagram of a printer using electronically-originated images and a calibration system in accordance with the invention.

Referring first to FIG. 1, a printing system using electronically-generated image input is shown with a calibration utility for matching a print 10, produced by a printing mechanism 12 of a printer 14, with a cathode-ray tube (CRT) display 16 on a CRT monitor 18. (While not essential for practice of the invention, the preferred calibration utility matches a thermally-produced print, generated by the thermal printing mechanism of a color printer, with the monitor display. More specifically, the utility is designed for the Model XL7700 color printer, manufactured by the Eastman Kodak Co., Rochester, N.Y. Other printers, however, may be readily used with suitable changes in the utility algorithms.)

Both the print 10 and the display 16 result from a digital image signal (code values) provided from an input memory 19. The image signal includes separate color component signals (separate code values) for the red (R), green (G), and blue (B) components of the image. The image itself originates from, e.g., internal computer graphics, a scanned image source, a television signal, or the like. The RGB image signal is conventionally processed in an image processing application software package 20, such as Photoshop (which is sold by the Adobe Corp.) or Color Studio (which is sold by the Letraset Corp.), until a desirable image appears on the monitor 18. During this procedure the switches 21a and 21b are set accordingly to provide a signal path from the memory 19 through the application software 20 to the monitor 18. The suitably processed RGB image signal is then returned on a line 20a for storage in the input memory 19. Additionally, the stored image signal is applied to the printer 14 on a line 19a and a print is made by the printer 14. (The switches 21a and 21b, as well as the various lines interconnecting the switches and the application software 20 and the input memory 19, are shown for ease of illustration and discussion. Typically, the switching function is accomplished by software, which allows selection between the calibration utility and the application software 20.)

There are two main factors that affect the appearance of a color print in relation to a display on a CRT monitor: tone reproduction and color reproduction. Tone reproduction or tone scale matching, as it is sometimes called, is the ability to match the luminance or brightness variations of the print to that of the monitor, both as to contrast gradations and as to the color balance of the neutral tones. For example, a black-and-white image having proper tone reproduction would have the dark (shadow) areas be nearly black, the white (highlight) areas be nearly white, and the greys (mid-tones) be the proper middle lightnesses, all without losing subtle detail in the shadow and highlight areas. In addition, the neutral tones will not have any predominant color cast. Color reproduction or color matching, as it sometimes called, is the ability to match the hue and saturation of a print color to that of the monitor. Hue and saturation, in conjunction with the luminance or brightness, help describe the perceived color. For example, hue is the property that distinguishes between a red object and a yellow object, while saturation is the property that distinguishes between a red object and a pink object. Pink has the same hue as does red, however it is much less saturated.

As shown in FIG. 1, a calibration utility system 22 provides an interactive ability to obtain a satisfactory match between the print 10 and the CRT image 16 on the CRT monitor 18, in particular providing real-time, operator-interactive feedback as to the magnitude of each change made to the image. A printer tone scale algorithm 28 and a color algorithm 30 are accordingly provided within the calibration utility 22 for generating corrections that provide matched images. Since it is helpful to initially view the input image only as processed by the application software 20, a default tone scale table 24 and a default color matrix 26 are contained within the image calibration utility 22 to provide a linear tone scale conversion and a unity color matrix, respectively, for initially recreating the input image without additional change. Corrections are then effected by a set of tone scale controls 32 and a set of color controls 34.

The tone scale controls 32 are operator-controlled adjustments for changing certain tone-related variables of the input image, including brightness (B), gamma (G), and contrast (C). Similarly, the color controls 34 are operator-controlled adjustments for changing certain color-related variables of the input image, including the saturation (S) and hue (H). As the operator changes these variables, the algorithms 28 and 30 accordingly calculate new correction terms that are sent to the printer 14. The same changes to the variables B, G, C, S, and H are applied to a monitor tone scale algorithm 36 and a monitor color matrix algorithm 38, which calculate new correction terms for reproducing the input image on the monitor 18. In accordance with the preferred embodiment, the monitor color matrix algorithm 38 directly uses the hue (H) and saturation (S) changes from the color controls 34 in its monitor color calculations, while the monitor tone scale algorithm 36 directly uses the brightness (B), gamma (G) and contrast (C) changes from the tone scale controls 32 in its monitor tone scale calculations.

Since three colors (red, green, and blue) are being processed, three separate sets of tone corrections are maintained. The separate sets, however, normally have the same values, i.e., the same tone corrections, for each code value entry. On occasion, however, a close match from a tone reproduction standpoint can be obtained although neutral colors still have a slight color cast. In that situation, the values of the tone scale corrections corresponding to the color cast are accordingly increased or decreased, and the color cast can be eliminated. The RGB tone scale monitor corrections are saved in a tone scale correction table 40 (comprised of three tone scale tables, not shown, one for each color) and the color matrix monitor corrections are saved in a correction matrix 42. In both cases, the monitor corrections are substantially the inverse of the corrections applied to the printer 14. Albeit their outcomes are inverted, the printer tone scale algorithm 28 and the monitor tone scale algorithm 36, as well as the printer color algorithm 30 and the monitor color algorithm 38, are substantially complementary in that incremental changes in the tone scale and color of the monitor image 16 produce like (but opposite) changes in the tone scale and color of the printed image 10.

Conventionally, as disclosed in U.S. Pat. Nos. 4,812,903 and 4,831,434, a video analogy is closely followed for image correction insofar as the RGB signals are transformed into a luminance signal and two color difference chrominance signals. According to this transformation, predetermined combination of the RGB signals form the luminance and chrominance signals (e.g., L=0.3R+0.6G+0.1B, U=B-Y, V=R-Y). Tone scale correction is then completed in the luminance channel and color errors are corrected in the chrominance channel. However, the need to maintain a constant luminance-chrominance ratio prevents total decoupling of the corrections, and a correction in one channel must be followed with, or accompanied by, changes in the other channel. According to the present invention, better decoupling is obtained by completing the tone scale corrections upon separate RGB signals in intensity space and doing color reproduction corrections upon combinations of RGB signals equivalent to color difference space.

Accordingly, in order to process the input image signal for display, the calibration utility 22 includes a tone scale look-up table (LUT) 44 (comprised of three LUTS 44a, 44b, 44c, one for each color component signal) operating upon the RGB signals in intensity space and a color matrix 46 operating upon combinations of RGB signals representative of chrominance signals in color difference space. Since the color correction is truely decoupled from the tone scale correction, the order of the process flow in the calibration utility 22 is not dictated by the color difference transformation. As shown in FIG. 1, the architecture of the calibration utility 22 is such that the color correction (color matrix 46) operationally occurs before the tone scale correction (tone scale LUT 44), although the reverse is true for the calibration functional flow (as shown in FIGS. 2A-2C, and FIG. 3). Furthermore, each tone scale LUT 44a, 44b, 44c provides brightness changes to input RGB code values separate and distinct for each color component signal while the color matrix 44 effectively provides a matrix transformation into color difference space (where combinations of RGB color component signals represent chrominance values) and back into intensity space. The terms of the color matrix 46, which are described later in this disclosure, are chosen to allow operator supplied changes (hue (H) and saturation (S)) which mathematically occur in color difference space.

The tone scale LUT 44 selects either the default linear terms in the table 24 (same for each color) or the tone scale corrections in the table 40, while the color matrix 46 selects either the default unity matrix 26 or the terms in the correction matrix 42. When the calibration utility 22 is first connected into the signal path by appropriate setting of the switches 21a and 21b, the linear tone scale table 24 and the unity matrix 26 are automatically accessed by the tone scale LUT 44 and color matrix 46, respectively, in order to initially reproduce the image just as it was processed by the image processing application software 20. Then, as the operator changes the input variables by means of the tone scale controls 32 and the color controls 34, the RGB tone scale corrections in the table 40 and the color matrix terms in the memory 42 are substituted for the linear tone scale (default) table 24 and the terms (default) in the unity matrix 26. The modified display signals from the calibration utility 22 are applied to a display gamma look-up table 45, which adjusts the signals for the gamma transfer characteristics of the CRT monitor 18. Gamma correction is a non-linearity possessing generally the opposite shape as the CRT gamma, and is purposely introduced in an attempt to partially cancel the effects of the CRT gamma. The display LUT 45 (and its included D/A converter) takes the digital code values that make up the image data and converts them into voltages that are fed to the monitor 18. The gamma-corrected signals then form the CRT image 16 on the CRT monitor 18.

Tone reproduction and color reproduction are corrected in the printer 14 by processing the input image from the memory 19 through a color matrix 48, an image calibration look-up table 49 (comprised of three adjustable LUTS 49a, 49b, 49c, one for each color component signal), and a printer calibration look-up table 50 (comprised of three predetermined, fixed LUTS 50a, 50b, 50c, one for each color component signal). Considering tone reproduction first, the printer calibration table 50 serves several, relatively permanent tone-related functions. First, it compensates for the non-linearities of the printing process (thermal, in this case) to make the printer 14 behave in a predictable way that is linearly related to some picture measurement, in particular, the density. Secondly, the printer calibration table 50 provides a way of recalibrating the printer 14 to handle different types of media. For example, different calibration tables may exist for each of several different print/media modes (e.g., color/B&W, reflection print/transparency, high/medium/low density transparency). In the preferred embodiment, the printer calibration table 50 operates the printer 14 in density space. That is, the input code values (image signal) from the input memory 19 are expected to be a function of density values, density being a logarithmic measure of the amount of light that is absorbed by the dyes in the print 10. As will be shown, however, the input code values are frequently not in density space, and therefore require further adjustment.

Finally, the printer calibration look-up table 50 ensures that the print 10 has the correct neutral balance, at least for certain predetermined viewing conditions. That is, the black, gray, and white areas of the print 10 should appear neutral, without any coloration to them. The separate printer calibration tables 50a, 50b, 50c, provide neutral color balance calibration for a typical print, given certain assumptions about the ambient viewing light, i.e, whether it is sunlight, incandescent, or fluorescent. (Typically these assumptions would not include the color temperature of the monitor 18, which can vary greatly depending on the type of monitor, and even within a given type. Matching the neutral densities of the print to the neutrals of the monitor display (slide by side match) typically requires, as will be explained, adjustment of one or more of the image calibration tables 49a, 49b, 49c).

In addition to the printer calibration table 50, the printer 14 contains the adjustable image calibration table 49. The purpose of the image calibration table 49 is to match the tone reproduction of the print 10 to that of the image source in the input memory 19. For example, if the printer is given a fully-corrected image signal that exists in density space (a space for which code values represent density steps), then a straight-line image calibration would give the optimum results, since the printer calibration table 50 has already calibrated the printer to operate in density space. Most image signals sent to the printer 14 exist in transmission (intensity) space, not density space. That happens because most electronic images are generated for viewing on a CRT monitor (such as the monitor 18), which operates with transmission values as corrected by the display gamma LUT 45. Because of the logarithmic relationship between density (D) and transmission (T) values, i.e., $D = \text{Log}(1/T)$, the optimum image calibration for normal images will have an exponential shape rather than a straight line shape. Therefore, the image calibration table 49 is typically a non-linear function that accounts for an image that is not in density space and that is reproduced in relation to certain default assumptions concerning brightness (B), gamma (G), and contrast (C).

More importantly, for purposes of the present invention, the image calibration table 49 also contains operator-supplied variations from the defaults, that is, tone scale corrections generated by using the algorithm 28 in the calibration utility 22. In the usual operation, the printer calibration table 50 and the image calibration table 49 will generate look-up values that provide tone scale and color balance correction of the input image. As with the corrections stored in the tone scale LUTS 44a, 44b, 44c, since three color component signals (RGB) are being processed, three separate sets of printer tone corrections are maintained in the LUTS 49a, 49b, and 49c. The tone scale aspects of the corrections in the three image calibration tables 49a, 49b, and 49c ordinarily have the same values, inasmuch as the three printer calibration tables 50a, 50b, and 50c provide correction for neutral color balance in a typical viewing situation (especially for single stimulus viewing situations, that is, when the output print is viewed by itself under standard lighting conditions). On some occasions, however, a close match from a tone reproduction standpoint can be obtained although neutral colors still have a slight color cast. (Typically this occurs in double stimulus situations, that is, when the output print is being compared to its image on the CRT monitor 18, which may have nonstandard illumination characteristics due to the variable color temperature of the monitor.) In these situations, the values of one or more of the image calibration tables 49a, 49b, and 49c corresponding to the color cast are accordingly increased or decreased, and the color cast in the print 10 can be eliminated.

Turning next to color reproduction, it is first noted that a significant portion of "color matching" is accomplished by having matching tone reproduction. If the tone reproduction is correct and the color is within the color gamut of both printer 14 and monitor 18, then the color match between the print 10 and the display 16 should be acceptable. Apart from tone reproduction, there are several other variables that can affect the perceived degree of color matching. The first factor is the monitor color temperature or white point. Broadcast television monitors are usually adjusted to approximately 6500 degrees K, which is very close to being perceived as neutral or white by most observers. Computer graphic monitors are usually adjusted to approximately 9300 degrees K, which has a slightly bluish appearance when compared to a white sheet of paper. The second factor is the color temperature of the ambient lighting. Because of the subtracting nature of the printing process, the perceived color of an object on a print is strongly influenced by the spectral energy distribution of the light source under which the print is being viewed. The third factor is the spectral characteristic of the dyes used in the printing process, and is closely related to the ambient lighting as mentioned above. Different dyes can have different spectral absorption characteristics for different wavelengths. It is possible, for example, to have two cyan dyes which look identical under tungsten lighting (approximately 3200 degrees K), but look quite different under fluorescent lighting (approximately 5000 degrees).

The printer 14 has a built-in default color matrix (not shown separately in the printer 14) having terms selected to compensate for one or more of a number of problems, including the cross-talk characteristics of the thermal printing dyes (that is, the overlapping spectral sensitivities of the dyes), dye transfer problems, phosphor characteristics and color temperature of the monitor, illuminant characteristics, and the like. (If such corrections are not made, the default matrix is a unity matrix.) Initially, these terms are accessed by the color matrix 48. If the foregoing compensation is still unacceptable, the saturation and hue adjustments of the color controls 34 in the calibration utility 22 can be used to further modify the print color. When the saturation and hue are accordingly adjusted and modification color matrix terms are generated by the printer color algorithm 30, the new terms are stored in a modification matrix memory 60 in the calibration utility 22. Meanwhile, the default terms are read from the color matrix 48 and written into a default matrix memory 62, also in the calibration utility 22. The modified terms and the default terms are multiplied in a matrix multiplication operation 64 and the resultant new matrix values are written into the color matrix 48 in the printer 14. The new terms in the color matrix 48 then become the old (default) terms for the matrix multiplication 64 as further color corrections are made. The printer color matrix 48 thus begins with the default matrix terms and, as corrections are made, is changed to contain the results of the matrix multiplication 64. The finally generated color matrix 48 accordingly modifies the image signal applied to the image calibration table 49.

Figure 2A:
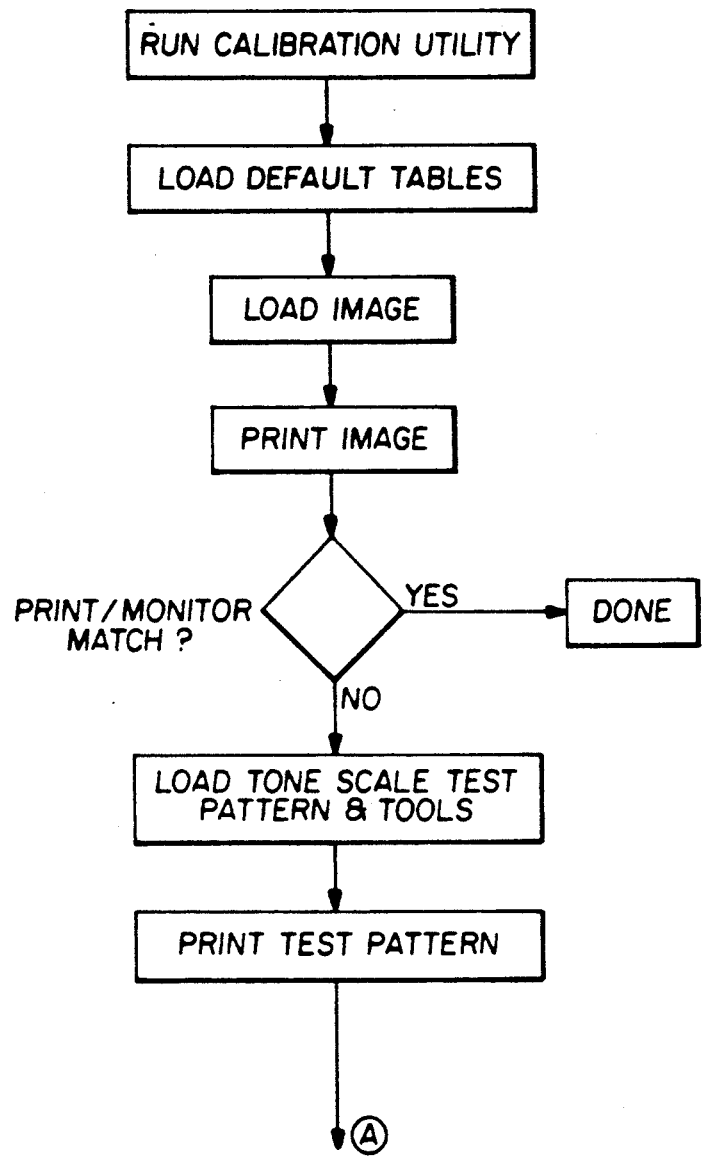
FIGS. 2A, 2B and 2C are diagrams of a general procedure for implementing decoupled tone scale and color correction in accordance with the invention.
Figure 2B:
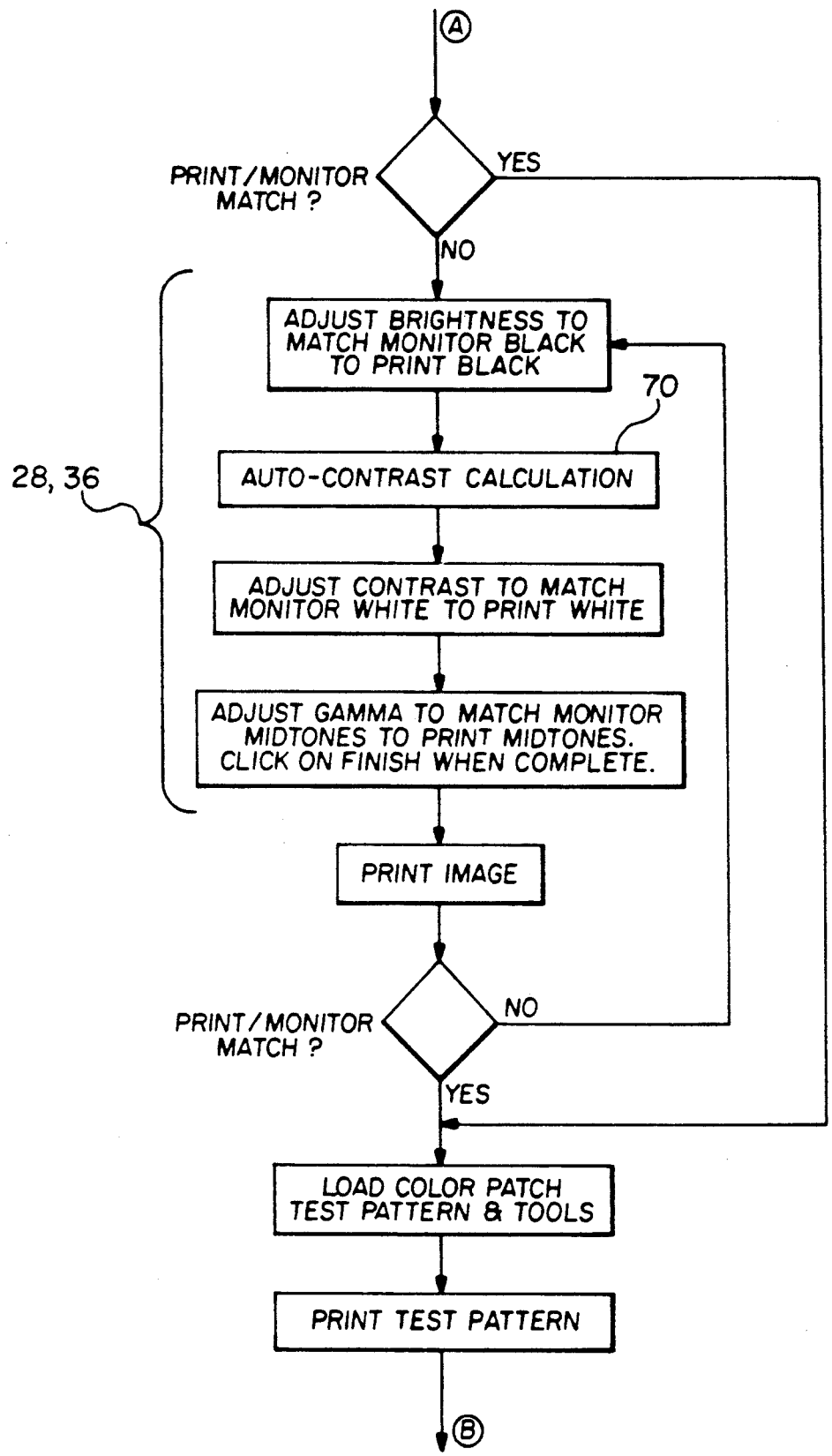
Figure 2C:
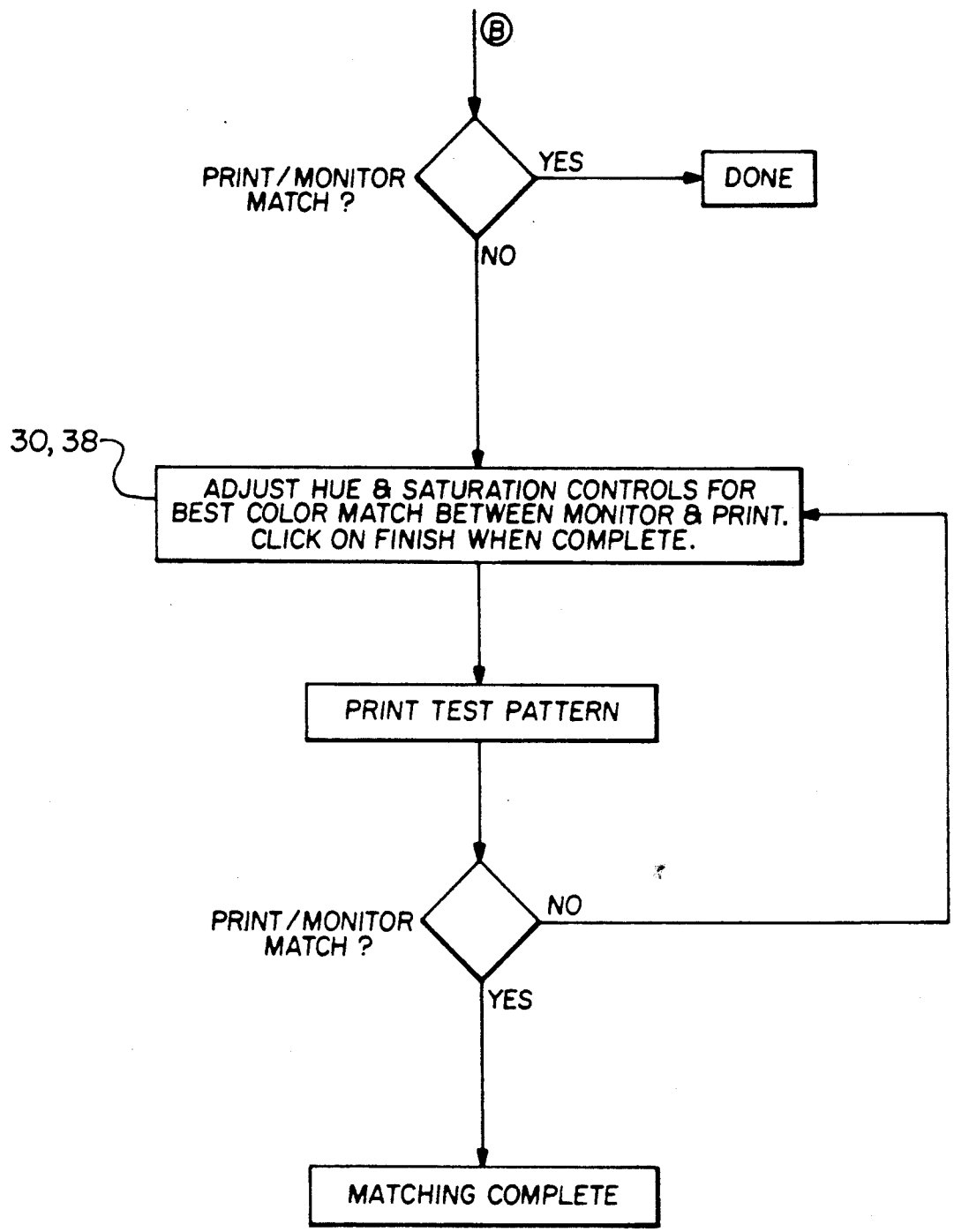

The general calibration procedure is outlined in FIGS. 2A-2C, particularly for situations where the printer calibration table 50 provides acceptable neutral color balance (no color cast) for a predetermined ambient lighting and for single-stimulus viewing. Turning initially to tone scale correction, the user is provided with the ability to control tone scale by utilizing a visual matching technique that can independently control the shadow, mid-tone, and highlight regions as rendered by the printer image calibration table 49. This allows the operator the ability to "match" each gray level on the monitor to the corresponding gray patch on the print. In practice, the gray levels corresponding to the shadow, mid-tone, and highlight regions are individually adjusted to calibrate the print to the monitor.

The procedure of FIG. 2A assumes that an acceptable display on the monitor 18 has first been generated by the image processing application software 20. Furthermore, in the preferred embodiment, the tone scale algorithms 28 and 36 are implemented for the Kodak XL7700 printer and a MacIntosh display. Characterization of several MacIntosh display systems has yielded a good starting point for the image calibration table 49. The recommended starting or default values for tone scale are:

| Brightness = −20 | Contrast = 1.14 | Gamma = 1.80 |
|---|---|---|
| (Shadows) | (Highlights) | (Mid-tones) |

The calibration utility 22 is then run with the monitor default values for tone scale and color, that is, with the linear LUT 24 for each tone scale LUT 44a, 44b, 44c and the unity matrix 26 for the color matrix 46. A print is then made and evaluated using the printer default values for tone scale and the color default values. If the print does not match the monitor, a tone scale test pattern (grey scale) is loaded into the input memory 19 and a print of the test pattern is made. Referring next to FIG. 2B, if the tone scale of the test print does not match the tone scale of the test pattern on the monitor, the printer and monitor tone scale algorithms 28 and 36 are enabled for each of the selected luminance levels.

The brightness part (B) of the tone scale control 32 is adjusted to set the shadow or black end of the displayed grey scale on the monitor to match the shadow or black end of the grey scale on the print. Making the brightness value more positive lightens the dark areas on the print, while making the brightness more negative will darken the print. After entering each new value for the brightness, the optimum contrast value is readjusted in an automatic contrast calculation 70 to obtain the maximum dynamic range on the print without clipping image detail near white. The contrast part (C) of the tone scale control 32 is next adjusted (if needed) to match the highlight area of the grey scale on the monitor to the highlight area of the grey scale on the print. Making the contrast number larger will lighten the highlights, while making it smaller will darken them. Finally, the gamma part (G) of the tone scale control 32 is adjusted to match the mid-tone area of the grey scale on the monitor to the corresponding mid-tone area of the grey scale on the print. Making the gamma number larger will darken the print, while making it smaller will lighten the print.

In effect, a perfectly acceptable monitor image has been adjusted to look "as bad as" the print. For each adjustment, the printer tone scale algorithm 28 generates correction terms for each of the image calibration tables 49a, 49b, and 49c, while substantially inverted terms are generated by the monitor tone scale algorithm 36 for changing the monitor display 16 (via the tone scale LUTS 44a, 44b, 44c). At this stage in the procedure, the corrected values output by the RGB tone scale LUTS 44a, 44b, and 44c, and the corrected values generated for the RGB image calibration tables 49a, 49b, and 49c, are the same regardless of color for each input code value. Also with each adjustment, the monitor display 16 is brought closer to the print 10 while, in fact, the printer 14 is being calibrated for an inverse result closer to the original monitor image. The adjustments may have to go through several complete iterations of brightness, contrast, and gamma to reach an acceptable match between the monitor and the print, depending on how far apart the two images are to start with and how critical the evaluation is. When the adjustments are completed, the operator exits the tone scale algorithms, and the monitor image 16 reverts to its original value (that is, using the default terms in the linear LUT 24). The new tone scale terms are written to the image calibration tables 49a, 49b, 49c in the printer 14. At this point a new print should be a close match to the monitor from a tone reproduction standpoint.

Figure 3:
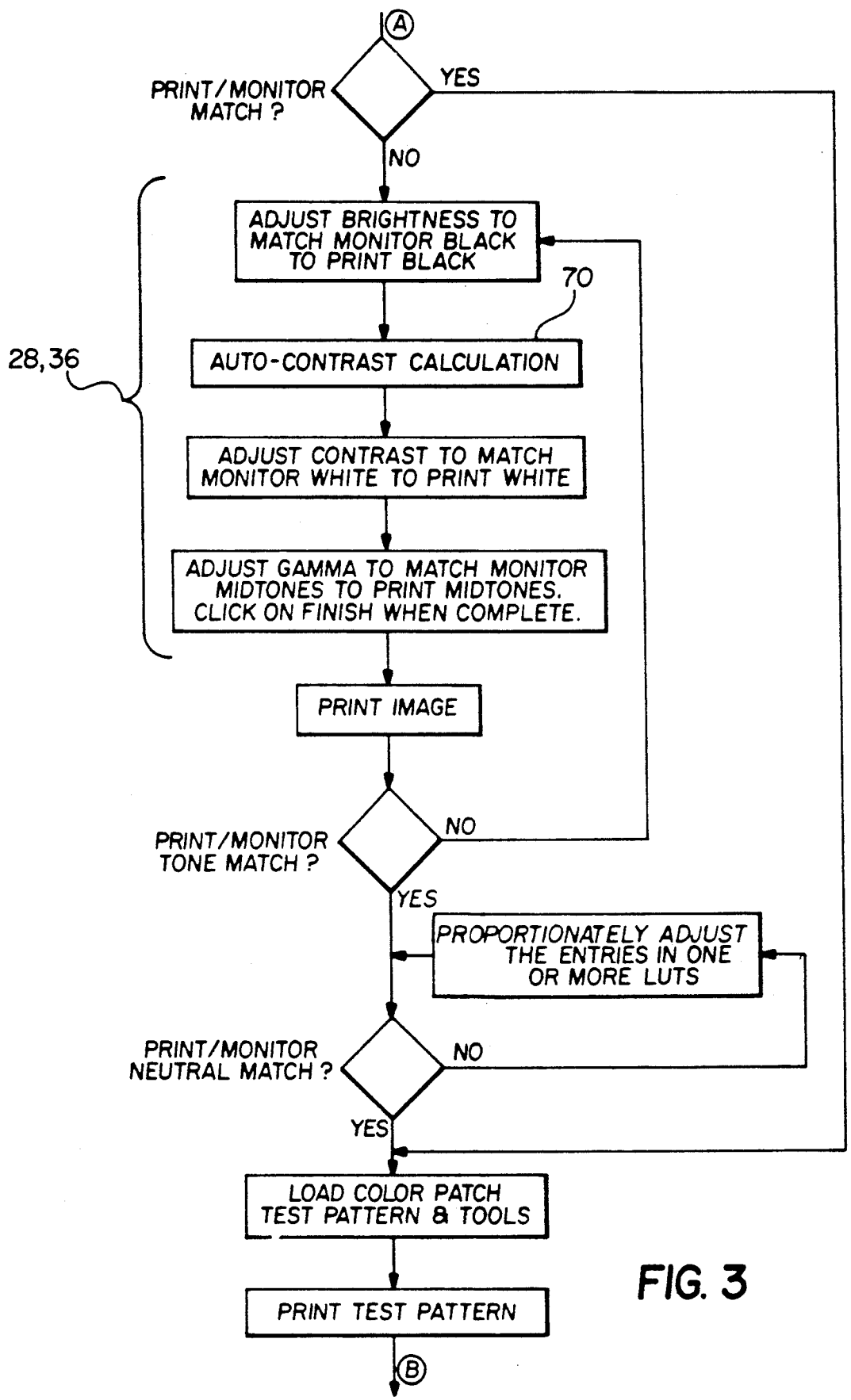
FIG. 3 is a diagram of a further refinement of the procedure for implementing a neutrally-balanced tone scale correction in accordance with the invention.

FIG. 3 shows a refinement of the calibration procedure following the printer and monitor tone scale algorithm portion 28, 36 where additional control of the neutral color balance is obtained by adjusting one or more of the tone scale LUTS 44a, 44b, or 44c and, correspondingly, one or more of the image calibration tables 49a, 49b, or 49c. The brightness (B), contrast (C), and gamma (G) are adjusted as before to obtain the desired brightness gradation. If neutral areas of the print still do not appear neutral (have a coloration to them), a value is added to or subtracted from the entries in the particular color table(s) that renders the color cast in the neutrals. The value may be a constant value added to each entry in the table. For example, if there is a cyan (blue plus green) cast to the neutrals, entering a value of −5 blue and −5 green would subtract 5 from all of the entries in the blue and green tables, making the print less cyan throughout the tonal range. Alternatively, entering a value of +5 red (red being the complement of cyan) would add 5 to all of the entries in the red image calibration table, and would have the effect of making the print slightly redder (and therefore tending toward neutral) throughout the tonal range, that is, from the dark areas to the highlights. Rather than being a constant, the value added to or subtracted from entries in the particular color table(s) may be proportional to density change. This allows adjustment of the color balance for the mid-tone neutrals without over-(or under-) correcting whites or blacks. For example, in order to maintain the same color shift throughout the entire tonal range, the entries can be proportionately changed from white to black, such that there is little or no change in the whites, gradually proceeding up to a maximum change in the blacks.

It is an important aspect of the invention that color adjustments can be decoupled from tone scale (brightness gradation) adjustments by completing both tone scale and neutral color balance adjustments before turning to color adjustments. Tone scale adjustments are completed as hereinbefore described while neutral color balance is completed in one (or both) of two ways (also hereinbefore described): by utilizing the predetermined color balance factors in the printer calibration tables 50a, 50b, and 50c or by adjusting some or all of the values in one or more of the image calibration tables 49a, 49b, and 49c. (The latter adjustments are matched on the monitor 18 by making complementary, but inverse, adjustments to one or more of the tone scale LUTS 44a, 44b, and 44c.) While functionally (or procedurally), the tone scale and color balance adjustments are disposed of before turning to color adjustments (as shown in FIGS. 2A, 2B, 2C, and 3), the decoupling obtained is sufficiently complete that the actual matrix and look-up operations can be completed in any order. For example, FIG. 1 shows the color matrixing occurring in the signal stream in both the calibration utility 22 and the printer 14 before the tone scale and printer calibration table look-up operations.

Once the user has achieved an acceptable tone scale match that is correctly color balanced in neutral areas, a color match can be initiated. A color patch test pattern is displayed on the monitor 18, and the operator makes a print of the pattern. The operator then compares the resulting print 10 to the monitor display 16 and determines if an acceptable level of color matching exists. Referring now to FIG. 2C, if the match is not acceptable, the operator executes the printer and monitor color algorithms 30 and 38, using the color controls 34 to adjust the saturation and hue of the image. Using hue (H) and saturation (S) as input variables, the color algorithms calculate the matrix coefficients required to achieve the desired hue or saturation shift on the print. The hue is expressed in degrees and has a range of −90 degrees to +90 degrees. The saturation is expressed in percent and has a range of zero to 200 percent. The default values of hue and saturation (which produce no change in the print) for the Kodak XL7700 printer and a MacIntosh display are:

| Hue = 0 degrees | Saturation = 100% |
|---|---|

As with tone scale, the operator adjusts the color controls to make the monitor look as close to, i.e., "as bad as", the print as possible. For each adjustment, the printer color algorithm 30 generates matrix terms for the modification matrix 60, while substantially inverted terms are generated by the monitor color algorithm 38 for changing the monitor display (via the color matrix 46). As with tone scale correction, each adjustment brings the monitor closer to the print 10 while, simultaneously, the printer 14 is being calibrated for an inverted result closer to the original monitor image. When the operator is satisfied with the match, the color matching process is completed and the monitor image reverts to its original value (using the unity matrix 26). New matrix values (default 62 multiplied by modification matrix 60) are then sent to printer matrix 48.

At this point, the printer tone scale algorithm 28 and the printer color algorithm 30 have calculated the printer parameters required to make the printer 14 respond inversely to what was done to the monitor image, and the result is a print that is a closer tone scale and color match to the monitor image. Clearly, however, it is inconsequential as to whether the printer responds inversely to monitor adjustments, or whether the monitor responds inversely to printer adjustments, for the result is the same. It is believed to be important, however, that, the tone scale adjustments be completed in the order illustrated in FIG. 2B, that is, brightness first, contrast second, and gamma last. The order of hue and saturation appears to be of less importance, although it is preferred to do saturation first.

The following sections pertain further to the use of the calibration method of the invention with the color printer, Model XL7700, manufactured by Eastman Kodak Company. Other printers, whether manufactured by Eastman Kodak Company or by another manufacturer, and whether operating by a thermal principle or some other printing principle, would require modifications in the printer and monitor equations, and in the default values. However, the concepts remain the same and implementation for other printers is within the capability of one of ordinary skill in this art.

Equations for Print to Monitor Matching

Set forth below are sets of equations constituting the printer and monitor tone scale algorithms 28 and 36 for calculating printer and monitor look-up tables, respectively, using brightness, contrast, and gamma as the input variables. Also included are sets of equations constituting the printer color algorithm 30 for calculating printer color matrix terms using saturation and hue as the input variables. In all cases, table values are calculated for 8 bit input code (image) values, that is, one table entry for each of 256 code values. Furthermore, the equations calculate the same table values for each of the three separate tables, that is, the same values for tone scale LUTS 44a, 44b, and 44c, and the same values for the image calibration tables 49a, 49b, and 49c. The equations are broken into several steps, including definitions, for purposes of clarity.

| Definitions: | |
| --- | --- |
| B = Brightness | R = Reflectance |
| C = Contrast | D = Density |
| G = Gamma | CV = Code Value |
| S = Saturation | H = Hue in degrees |
| $O_c$ = Offset value from Red, Green, Blue sliders | |
| ALUT = Absolute LUT | RLUT = Relative LUT |
| T = Transmittance | $T_d$ = Default Monitor Transmittance |
| $C_{auto}$ = Auto Contrast | MLUT = Monitor LUT |
| X = Contrast Factor | $R_{255}$ = Reflectance for CV = 255 |
| * = Multiplication | / = Division |
| $\wedge$ = Exponentiation | LOG(x) = Log(base 10) of x |

IF[condition,x,y] = IF condition is TRUE then x, if FALSE then y

Printer Equations (for printer tone scale algorithm 28):

$$R = IF[((CV + 1 + B) < 0, 0.003162, IF[B < 0, \quad (1)$$
$$((((CV + 1 + B)/256)\wedge(0.9*G))*C + 0.003162 -$$
$$(1/256)\wedge(0.9*G)),$$
$$((CV + 1)/256\wedge(0.9*G))*C + 0.003162 - (1/256)\wedge(0.9*G)]]$$

$$D = IF[R < 0.003162, 2.5, LOG(1/R)] \quad (2)$$

$$ALUT = IF[(D/2.5*255) < 0, 0, \quad (3)$$
$$IF[B < 0, D/2.5*255, D/2.5*255 - B]]$$

$$RLUT = IF[ALUT > 255, 0, IF[ALUT < 0, 255, 255 - ALUT]] \quad (4)$$

The equations above will compute values (RLUT) for the calibration table 49 that have minimum interaction between the controls 32. (Each table 49a, 49b, 49c will have the same set of values). The look-up table will have a common starting point for any value of brightness offset regardless of contrast or gamma. Similarly, the end point is unaffected by gamma.

If the color balance is adjusted by modifying one or more of the calibration tables 49a, 49b, or 49c, it may be preferable, as hereinbefore disclosed, to make the change in the particular table(s) proportional to density change. This is done by initially deriving values from the equations (1)–(4) for the green table, and then, using the green density values ($D_G$) from equation (2), recalculate the density values from equation (2) for the red and blue table using a density scale factor $SF_R$, $SF_B$), as follows:

$$D_R = SF_R * D_G$$

$$D_B = SF_B * D_G$$

New absolute LUT (ALUT) and relative LUT (RLUT) values for the red and green tables are then calculated according to equations (3) and (4), using the respective $D_R$ or $D_G$ values as input variables.

Monitor Equations (for monitor tone scale algorithm 36):

$$T = IF[((CV + 1 + B) < 0,$$
$$-1* (ABS(((CV + 1 + B)/256))\wedge(0.9*G)*C + 0.003162 -$$
$$(1/256)\wedge(0.9*G)),((CV + 1 + B)/256)\wedge(0.9*G)*C + 0.003162 -$$
$$(1/256)\wedge(0.9*G)]]$$

$$MLUT = IF[CV + (T_d - T)*255 - O_c > 255, 255,$$
$$IF[CV + (T_d - T)*255 - O_c < 0, 0, CV + (T_d - T)*255 - O_c]]$$

The monitor LUT (MLUT) values are based on a table 37 (FIG. 1) of default transmittance values ($T_d$) Initially, the default transmittance table 37 is calculated for each code value according to the monitor equations for a set of default tone scale values, in particular, brightness (B)=−20, gamma (G)=1.80, and contrast (C)=1.14. These are the starting values, and the resulting table is denoted as $T_d$. If the brightness, gamma, and/or contrast controls 32 are then adjusted, a set of monitor LUT (MLUT) values are calculated, using the default transmittance table values ($T_d$). The equations above will compute a monitor look-up table (i.e., tone scale LUTS 44a, 44b, and 44c) that will cause the monitor to change brightness in the opposite direction to that of the print. This is used, as explained hereinbefore, to give the user visual feedback while doing the tone-scale matching. If a further iteration of tone scale is required, a new set of default values are calculated, using the previous transmittance values as the new default monitor transmittance table ($T_d$), that is, using the previous B, G, and C values (of the last iteration).

Auto Contrast (for the automatic contrast calculation 70)

The auto-contrast routine 70 (FIG. 2B) calculates the optimum contrast (C) value to obtain the maximum dynamic range on the print without clipping image detail near white. For example, if the brightness is raised to +20 (making the dark areas lighter), the table values would flatten out or clip near the white end (code values near 255). The auto-contrast routine will calculate a contrast value that will cause the maximum table to just reach 255 without clipping.

Whenever the brightness value is changed, the contrast value is checked to ensure that the white (255) end of the printer LUT curve reaches a maximum of 255 without being clipped. The equations to automatically calculate the optimum contrast value are as follows.

$$X = IF[B<0, 1, 1/log^{-1}(B*2.5/255)]$$

$$C_{auto} = X/R_{255}*C$$

The procedure is used in calculation of the printer tone scale algorithm 28 using the new brightness value and old contrast value. Then, X and $C_{auto}$ are calculated, and the tone scale algorithm 28 is recalculated using $C_{auto}$ in place of the old contrast value.

Color Matching

Color matching is performed using hue (H) and saturation (S) controls 34. The operator-supplied H & S values define the modification matrix 60 which is used to modify (by matrix multiplication 64) the existing color matrix coefficients that reside in the color matrix 48. The newly calculated matrix coefficients (new=old x modifier) are then downloaded to the color matrix 48 in the printer 14 to be used for subsequent prints. The same H & S values are applied to the monitor color algorithm 38, which generates corresponding, but inverted, changes in the monitor image. The matrix equations are as follows:

Modification Matrix Equations (for the printer color algorithm 30):

$$a_{11} = 0.299 + (100/S)*(0.701 \, Cos(-H) - 0.168 \, Sin(-H))$$

$$a_{12} = 0.587 - (100/S)*(0.587 \, Cos(-H) + 0.330 \, Sin(-H))$$

$$a_{13} 0.114 - (100/S)*(0.114 \, Cos(-H) - 0.498 \, Sin(-H))$$

$$a_{21} = 0.299 + (100/S)*(0.328 \, Sin(-H) - 0.299 \, Cos(-H))$$

$$a_{22} = 0.587 + (100/S)*(0.413 \, Cos(-H) - 0.035 \, Sin(-H))$$

$$a_{23} = 0.114 - (100/S)*(0.114 \, Cos(-H) + 0.292 \, Sin(-H))$$

$$a_{31} = 0.299 - (100/S)*(1.248 \, Sin(-H) + 0.299 \, Cos(-H))$$

$$a_{32} = 0.587 + (100/S)*(1.045 \, Sin(-H) - 0.587 \, Cos(-H))$$

$$a_{33} = 0.114 + (100/S)*(0.203 \, Sin(-H) + 0.886 \, Cos(-H))$$

Monitor Equations (for monitor color algorithm 38)

$$a_{11} = 0.299 + (0.01S)*(0.701 \, Cos(H) - 0.168 \, Sin(H))$$

$$a_{12} = 0.587 - (0.01S)*(0.587 \, Cos(H) + 0.330 \, Sin(H))$$

$$a_{13} 0.114 - (0.01S)*(0.114 \, Cos(H) - 0.498 \, Sin(H))$$

$$a_{21} = 0.299 + (0.01S)*(0.328 \, Sin(H) - 0.299 \, Cos(H))$$

$$a_{22} 0.587 + (0.01S)*(0.413 \, Cos(H) - 0.035 \, Sin(H))$$

$$a_{23} = 0.114 - (0.01S)*(0.114 \, Cos(H) + 0.292 \, Sin(H))$$

$$a_{31} = 0.299 - (0.01S)*(1.248 \, Sin(H) + 0.299 \, Cos(H))$$

$$a_{32} = 0.587 + (0.01S)*(1.045 \, Sin(H) - 0.587 \, Cos(H))$$

$$a_{33} = 0.114 + (0.01S)*(0.203 \, Sin(H) + 0.886 \, Cos(H))$$

The calibration utility according to the preferred embodiment is designed for utilization with a MacIntosh computer and display system, which has an inherent monitor color algorithm that uses hue and saturation values to modify the color reproduction of the monitor image. Therefore, in this embodiment, the inverse versions of the hue and saturation changes provided by the color controls 34 are input directly to the MacIntosh system. This is shown schematically in FIG. 1 by a line 38a originating from the monitor color algorithm 38, which in this embodiment merely inverts the hue and saturation values (instead of applying the above monitor equations) and applies the inverse values to the computer system, bypassing the color matrix 46. For example, if the saturation in one color is changed by the printer color algorithm 30 from 100% to 120%, a value of 1½ is applied as a multiplier to the previous monitor saturation value, and a hue change in one color of +5° is applied to the monitor as a modifier of −5°. In both cases, the MacIntosh system uses the inverse values as input variables to its own color reproduction software, and the monitor image is changed accordingly. Where it is not desirable to utilize the host computer's color reproduction algorithm, the inverse hue and saturation matrix terms are calculated by the monitor color algorithm 38 as hereinbefore illustrated and applied to the color matrix 46.

While FIG. 1 is shown as a block diagram, the preferred embodiment will have most blocks implemented in software and the resultant processing completed by a programmed computer (particularly in the case of the calibration utility 22) or by an internal digital processor (in some embodiments of the printer 14).

The invention has been described in detail with particular reference to a presently preferred embodiment, but it will be understood that variations and modifications can be effected within the spirit and scope of the invention.

What is claimed is:

1. Method for calibrating an electronic output system of a color printer so that a color error in a printed image generated by the printer from an input stored image signal comprising separate color component signals can be corrected without affecting the tone scale of the image as obtained on a video monitor, the electronic output system including a tone scale correction function and a color matrix for processing the input image signal and thereby correcting tone scale and color errors, said method comprising the steps of:

generating an acceptable image on the monitor from the stored image signal;

printing the stored image signal to obtain a hard copy print;

comparing the hard copy print to the monitor image for tone scale rendition;

providing a separate tone scale look-up table for processing each of the color component signals;

adjusting said tone scale rendition of the monitor and printer in a complementary, but substantially inverse, manner until the monitor image substantially resembles the hard copy image and the brightness of a predetermined number of image levels on the monitor accurately resemble the image levels on the hard copy print;

generating a tone-adjusted hard copy print from the adjusted image signal;

examining the tone adjusted print for coloration in neutral areas;

adjusting the values in one or more look-up tables for the one or more particular colors producing the coloration in the neutral areas, thereby producing a neutrally-adjusted image signal substantially free of neutral coloration;

generating neutrally-adjusted hard copy print from the neutrally-adjusted image signal;

examining the neutrally-adjusted print for further color errors in one or more specific colors; and generating new matrix terms based on changes in at least one of saturation and hue for minimizing the color errors in said one or more specific colors.

2. The method as claimed in claim 1 wherein the step of adjusting the values in the one or more look-up tables comprises equally adjusting the values in said look-up tables.

3. The method as claimed in claim 1 wherein said step of adjusting the values in the one or more look-up tables comprises proportionately adjusting the values in each of said one or more look-up tables.

4. The method as claimed in claim 3 wherein the proportionate adjustment is proportional to density of the image.

5. A method for calibrating an electronic output system of a color printer so that a color error in a printed image generated by the printer from an input image signal comprising separate color component signals can be corrected without affecting the tone scale of the image, the electronic output system including a tone scale look-up function for correcting tone scale errors and a color matrix for correcting color errors, said method comprising the steps of:

providing separate tone scale look-up tables for respectively processing each of the color component signals;

adjusting the tone scale look-up tables until image brightness is accurately rendered by the image signal;

generating a tone-corrected image from the image signal;

examining the tone-corrected image for coloration in neutral areas;

providing a neutral correction to the color component signals by proportionately adjusting the values in the tone scale look-up tables for the particular colors that produce the coloration in the neutral areas, thereby producing neutrally-adjusted image signals substantially free of neutral coloration;

generating an image from the neutrally-adjusted image signal;

examining the neutrally-adjusted image for color errors in one or more colors; and generating new matrix terms based on changes in at least one of saturation and hue for minimizing the color errors in said one or more colors.

6. The method as claimed in claim 5 wherein the proportionate adjustment is proportional to density of the image.

* * * * *